US 9,952,904 B2

(12) United States Patent
Ash et al.

(10) Patent No.: US 9,952,904 B2
(45) Date of Patent: Apr. 24, 2018

(54) DISTRIBUTING TRACKS TO ADD TO CACHE TO PROCESSOR CACHE LISTS BASED ON COUNTS OF PROCESSOR ACCESS REQUESTS TO THE CACHE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 14/832,670

(22) Filed: Aug. 21, 2015

(65) Prior Publication Data

US 2017/0052822 A1 Feb. 23, 2017

(51) Int. Cl.
G06F 12/00 (2006.01)
G06F 9/50 (2006.01)
G06F 12/0806 (2016.01)

(52) U.S. Cl.
CPC .......... *G06F 9/5016* (2013.01); *G06F 9/5083* (2013.01); *G06F 12/0806* (2013.01); *G06F 2212/1024* (2013.01)

(58) Field of Classification Search
CPC ......... G06F 2212/1024; G06F 12/0802; G06F 12/0866; G06F 12/0895; G06F 17/30132; G06F 12/123; G06F 2212/1044; G06F 12/0893; G06F 12/122; G06F 12/128

USPC .................................................. 711/162, 134
See application file for complete search history.

(56) References Cited

U.S. PATENT DOCUMENTS

| 5,542,066 A | 7/1996 | Mattson et al. |
| 5,717,893 A | 2/1998 | Mattson |
| 5,742,792 A | 4/1998 | Yanai et al. |
| 5,889,935 A | 3/1999 | Ofek et al. |
| 6,012,126 A | 1/2000 | Aggarwal et al. |
| 6,052,797 A | 4/2000 | Ofek et al. |

(Continued)

OTHER PUBLICATIONS

Final Office Action dated Mar. 24, 2017, pp. 15, for U.S. Appl. No. 14/832,626, filed Aug. 21, 2015.

(Continued)

*Primary Examiner* — Mardochee Chery
(74) *Attorney, Agent, or Firm* — David W. Victor; Konrad Raynes Davda & Victor LLP

(57) ABSTRACT

Provided are a computer program product, system, and method for distributing tracks to add to cache to processor cache lists based on counts of processor access requests to the cache. There are a plurality of lists, wherein there is one list for each of the plurality of processors. A determination is made as to whether the counts of processor accesses of tracks are unbalanced. A first caching method is used to select one of the lists to indicate a track to add to the cache in response to determining that the counts are unbalanced. A second caching method is used to select one of the lists to indicate the track to add to the cache in response to determining that the counts are balanced. The first and second caching methods provide different techniques for selecting one of the lists.

23 Claims, 7 Drawing Sheets

(56) References Cited

U.S. PATENT DOCUMENTS

| | | | |
|---|---|---|---|
| 6,327,644 B1* | 12/2001 | Beardsley | G06F 12/123 |
| | | | 711/113 |
| 6,615,318 B2 | 9/2003 | Jarvis et al. | |
| 6,965,970 B2 | 11/2005 | Mosur et al. | |
| 9,665,493 B2* | 5/2017 | Ash | G06F 12/0875 |
| 9,710,398 B2 | 7/2017 | Ash et al. | |
| 2008/0021853 A1 | 1/2008 | Modha et al. | |
| 2013/0097387 A1 | 4/2013 | Sanchez Martin et al. | |
| 2014/0223106 A1 | 8/2014 | Shivashankaraiah et al. | |
| 2015/0026409 A1 | 1/2015 | Ash et al. | |
| 2016/0098295 A1* | 4/2016 | Ash | G06F 12/0875 |
| | | | 718/106 |
| 2016/0140053 A1 | 5/2016 | Ash et al. | |
| 2016/0321189 A1* | 11/2016 | Ash | G06F 12/125 |
| 2017/0052897 A1 | 2/2017 | Ash et al. | |
| 2017/0052898 A1 | 2/2017 | Ash et al. | |
| 2017/0052902 A1 | 2/2017 | Ash et al. | |
| 2017/0052903 A1 | 2/2017 | Ash et al. | |

OTHER PUBLICATIONS

Response dated Feb. 17, 2017, pp. 11, Office Action dated Nov. 15, 2016, pp. 29, for U.S. Appl. No. 14/832,626, filed Aug. 21, 2015.

R. Sampson, et al., "ZCache Skew-ered", Advanced Computer Architecture Lab University of Michigan, pp. 9, Published in Proc. of the 9th Annual Workshop on Duplicating, Deconstructing, and Debunking (2011).

B.S. Gill, et al., "SARC: Sequential Prefetching in Adaptive Replacement Cache", USENIX Association, 2005 USENIC Annual Technical Conference, 2005, pp. 16.

K. Kedzierski, et al., "Adapting Cache Partitioning Algorithms to Pseudo-LRU Replacement Policies", IEEE, 2010, pp. 12.

Document entitled List of Patents or Patent Applications Treated as Related,. dated Aug. 21, 2015, pp. 2.

U.S. Appl. No. 14/832,596, filed Aug. 21, 2015.
U.S. Appl. No. 14/832,614, filed Aug. 21, 2015.
U.S. Appl. No. 14/832,626, filed Aug. 21, 2015.
U.S. Appl. No. 14/832,642, filed Aug. 21, 2015.

Office Action dated Nov. 15, 2016, pp. 29, for U.S. Appl. No. 14/832,626, filed Aug. 21, 2015.

Office Action dated Aug. 11, 2017, pp. 24, for U.S. Appl. No. 14/832,596, filed Aug. 21, 2015.

Office Action dated Jul. 18, 2017, pp. 26, for U.S. Appl. No. 14/832,614, filed Aug. 21, 2015.

Response dated Jul. 22, 2017, pp. 11, to Final Office Action dated Mar. 24, 2017, pp. 15, for U.S. Appl. No. 14/832,626, filed Aug. 21, 2015.

Office Action dated Jul. 27, 2017, pp. 25, for U.S. Appl. No. 14/832,642, filed Aug. 21, 2015.

Response dated Oct. 18, 2017, pp. 9, to Office Action dated Jul. 18, 2017, pp. 26, for U.S. Appl. No. 14/832,614, filed Aug. 21, 2015.

Notice of Allowance dated Nov. 3, 2017, pp. 13, for U.S. Appl. No. 14/832,614, filed Aug. 21, 2015.

Response dated Oct. 27, 2017, pp. 12, to Office Action dated Jul. 27, 2017, pp. 25, for U.S. Appl. No. 14/832,642, filed Aug. 21, 2015.

Response dated Nov. 13, 2007, pp. 13, to Office Action dated Aug. 11, 2017, pp. 24, for U.S. Appl. No. 14/832,596, filed Aug. 21, 2015.

Notice of Allowance dated Nov. 17, 2017, pp. 11, for U.S. Appl. No. 14/832,642, filed Aug. 21, 2015.

Notice of Allowance dated Dec. 1, 2017, pp. 15, for U.S. Appl. No. 14/832,596, filed Aug. 21, 2015.

* cited by examiner

Cache Control Block

LRU List Information

DISTRIBUTING TRACKS TO ADD TO CACHE TO PROCESSOR CACHE LISTS BASED ON COUNTS OF PROCESSOR ACCESS REQUESTS TO THE CACHE

BACKGROUND OF THE INVENTION

1. Field of the Invention

The present invention relates to a computer program product, system, and method for distributing tracks to add to cache to processor cache lists based on counts of processor access requests to the cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

When processes access a track in the cache, a track identifier of the accessed track needs to be moved to the MRU end of the LRU list. To move a track identifier to the MRU end, a lock needs to be obtained on the LRU list. If multiple processes are trying to access the cache, then contention for the LRU list lock among the multiple processes may delay cache processing. One technique for addressing LRU list lock contention is to defer MRU processing and perform the MRU processing to move track identifiers to the MRU end of the list in a batch mode.

SUMMARY

Provided are a computer program product, system, and method for distributing tracks to add to cache to processor cache lists based on counts of processor access requests to the cache. There are a plurality of lists, wherein there is one list for each of the plurality of processors. A count of a number access requests for each of the processors resulting in one of the tracks being maintained in the cache is maintained. A track to add to cache for a request from an initiating processor comprising one of the processors is received. A determination is made as to whether the counts for the processors are unbalanced. A first caching method is used to select one of the lists to indicate the track to add to the cache in response to determining that the counts are unbalanced. A second caching method is used to select one of the lists to indicate the track to add to the cache in response to determining that the counts are balanced. The first and second caching methods provide different techniques for selecting one of the lists.

DETAILED DESCRIPTION

As processing power increases, the number of independent central processing unit (CPU) threads that can separately access the cache also increases. Whenever one of the threads accesses a track in the cache, the thread needs to obtain a lock on the LRU list to move the track identifier of the accessed track to the MRU end of the LRU list. An increased number of threads accessing the cache increases contention for the LRU list lock, which may delay other processes access to the cache.

Described embodiments address the LRU list lock contention issues introduced by increasing processing capacity by having multiple LRU lists, where each processor is assigned a group of cache control blocks and a separate LRU list to access, having a separate LRU list lock. This reduces contention, by providing separate LRU lists for the processors to access.

Described embodiments further consider the counts of processors initiating access requests that result in tracks being added to the cache to determine an LRU list selection method. If the access request distribution among the processors is unbalanced, e.g., the standard deviation exceeds a threshold, then an LRU list is selected according to a method that evenly distributes tracks to add to the cache among the LRU lists. On the other hand, if the list is balanced, then an LRU list is selected according to a second caching method that adds the track to the LRU list for the processor initiating the access request, a processor affinity method. The processors may then separately execute a demotion task to demote tracks in the cache indicated in their LRU lists.

Figure 1:
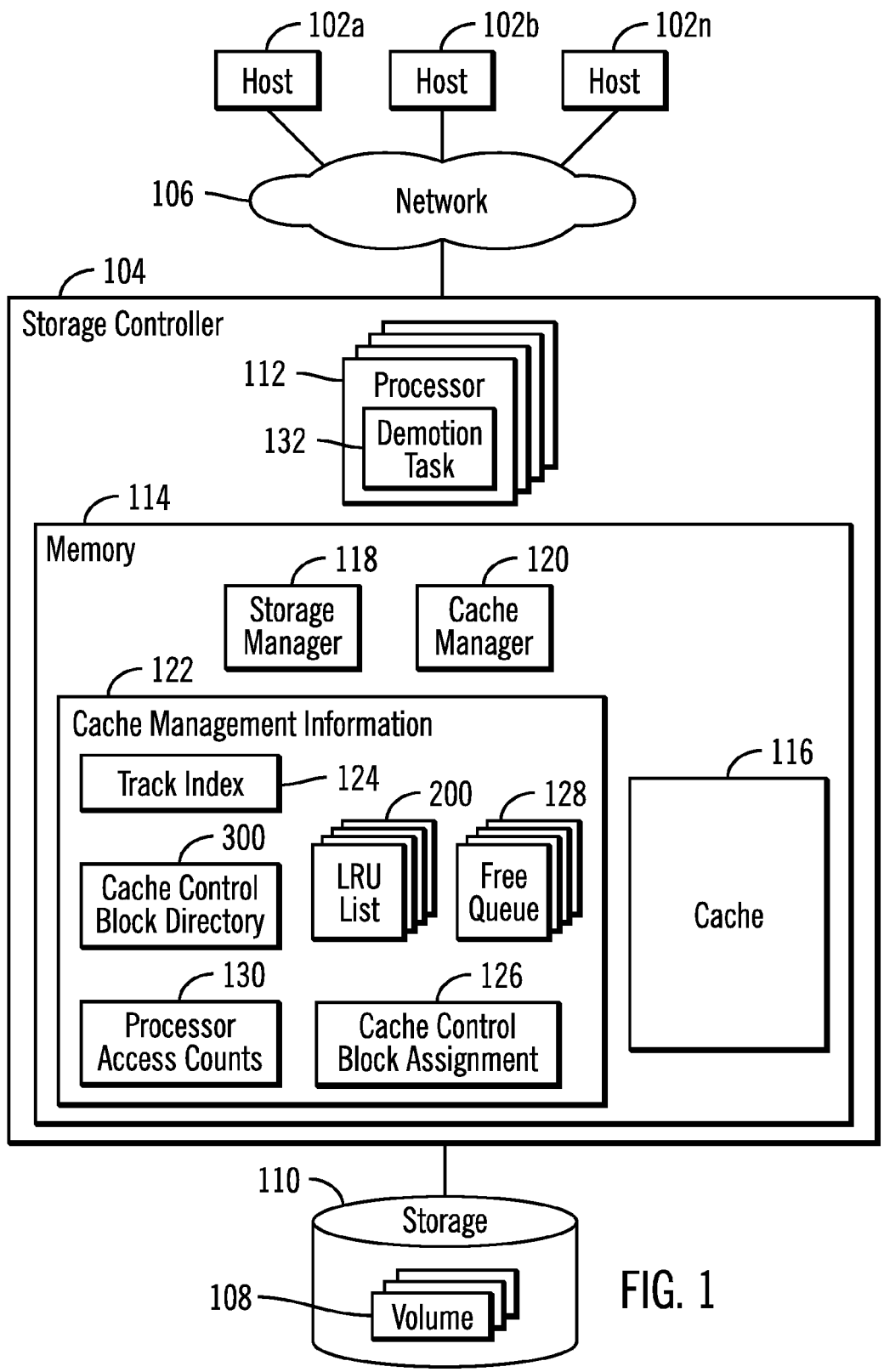
FIG. 1 illustrates an embodiment of a computing environment.

FIG. 1 illustrates an embodiment of a computing environment. A plurality of hosts 102a, 102b . . . 102n may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes a plurality of processors 112 and a memory 114, including a cache 116 to cache data for the storage 110. Each of the processors 112 may comprise a separate central processing unit (CPU), one or a group of multiple cores on a single CPU, or a group of processing resources on one or more CPUs. The cache 116 buffers data transferred between the hosts 102a, 102b . . . 102n and the volumes 108 in the storage 110.

The memory 114 further includes a storage manager 118 for managing the transfer of tracks transferred between the hosts 102a, 102b . . . 102n and the storage 110 and a cache manager 120 that manages data transferred between the hosts 102a, 102b . . . 102n and the storage 110 in the cache 116. A track may comprise any unit of data configured in the storage 110, such as a track, Logical Block Address (LBA), etc., which is part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300 and a plurality of Least Recently Used (LRU) lists 200 providing a temporal ordering of tracks in the cache 116. In one embodiment, there is at least one LRU list 200 for each of the processors 112. In this way, each of the processors $112_i$ may independently process the LRU list $200_i$ associated with the processor $112_i$ to process the tracks in the cache indicated in the processor LRU list $200_i$. The control block directory 300 includes the cache control blocks, where there is one cache control block for each track in the cache 116 providing metadata on the track in the cache 116. The track index 124 associates tracks with the cache control blocks providing information on the tracks in the cache. Upon determining that the cache 116 is full or has reached a threshold level, the LRU lists 200 are used to determine tracks from the cache 116 to demote.

In one embodiment, the processors 112 may each invoke a demotion task 132i, running on processor 112i, to process the LRU list 200i for the processor 112i to determine tracks indicated on the processor LRU list 200i to demote from the cache 116.

The demotion task 132 may involve discarding the track in the cache 116, such as by indicating the cache control block for the demoted track in a free queue. The cache control block for the demoted track may be selected from the free queue to use for a new track to add to the cache 116 and at that time any data from the demoted track would be overwritten by the new track. Alternatively, the demoted track may be erased immediately when demoted.

In the described embodiments, the lists 200 comprise LRU lists. In alternative embodiments, the lists 200 may comprise other types of lists to organize indication of tracks in the cache 116.

The cache management information 122 further includes a cache control block assignment 126 that provides an assignment of cache control blocks to the processors 112, such that each processor 112 is assigned a group of cache control blocks. In this way, when a track is added to the cache 116 as a result of processing by one of the processors 112, a cache control block assigned to that processor 112 is allocated for the track in the cache 116. In one embodiment, each of the processors 112 may be assigned a range of sequential cache control block index values. Further, each processor 112 may be assigned a separate free queue 128 to identify cache control blocks assigned to the processor 112 that are unassigned, or available to be allocated to tracks being added to the cache 116 by that processor 112. The demotion operation may involve discarding the track in the cache 116, such as by indicating the cache control block for the demoted track in the free queue 128 of the processor associated with the LRU list from which the track is demoted. The cache control block for the demoted track may be selected from the free queue to use for a new track to add to the cache 116 and at that time any data from the demoted track would be overwritten by the new track. Alternatively, the demoted track may be erased immediately when demoted.

The cache manager 120 further maintains processor access counts 130 which provide for each processor 112 a number of access requests initiated by that processor 112 which resulted in the accessed data being maintained in the cache 116, such as a read or prefetch request. The access counts 130 may be reset after a predetermined interval.

The storage manager 118 and cache manager 120 are shown in FIG. 1 as program code loaded into the memory 114 and executed by one or more of the processors 112. Alternatively, some or all of the functions may be implemented in hardware devices in the storage controller 104, such as in Application Specific Integrated Circuits (ASICs).

The storage 110 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts 102a, 102b . . . 102n may connect to the storage controller 104 over a bus interface, such as a Peripheral Component Interconnect (PCI) bus interface and other interfaces known in the art.

Figure 2:
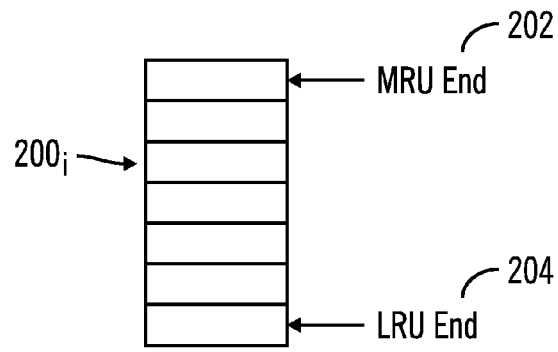
FIG. 2 illustrates an embodiment of a Least Recently Used (LRU) list.

FIG. 2 illustrates an embodiment of one of the LRU lists $200_i$ as having a most recently used (MRU) end 202 identifying a track most recently added to the cache 116 or most recently accessed in the cache 116 and a least recently used (LRU) end 204 from which the track identified at the LRU end 204 is selected to demote from the cache 116. The LRU end 204 points to a track identifier, such as a track identifier address or a cache control block index for the track, of the track that has been in the cache 116 the longest for tracks indicated in that list $200_i$.

Figure 3:
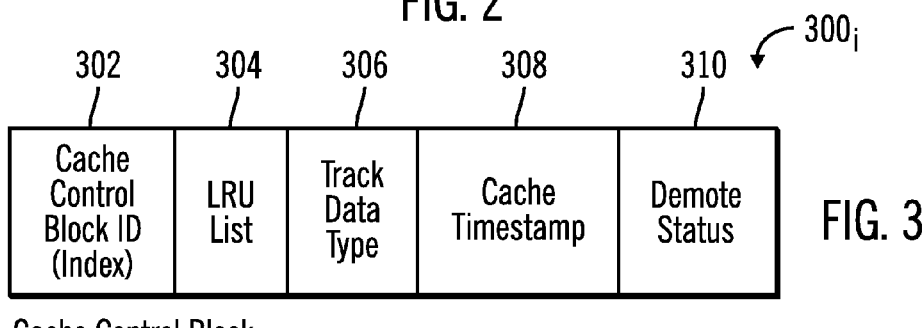
FIG. 3 illustrates an embodiment of a cache control block.

FIG. 3 illustrates an embodiment of a cache control block $300_i$ for one of the tracks in the cache 116, including, but not limited to, a cache control block identifier 302, such as an index value of the cache control block $300_i$; the LRU list 304, e.g., one of LRU lists $200_i$, in which the track associated cache control block $300_i$ is indicated; a track data type 306, such unmodified sequentially accessed track, unmodified non-sequentially accessed track, etc.; a cache timestamp 308 indicating a time the track was added to the cache 116 and indicated on the LRU list 304; and a demote status 310 indicating whether the track identified by the cache control block $300_i$ is to be demoted from the cache 116.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figure 4:
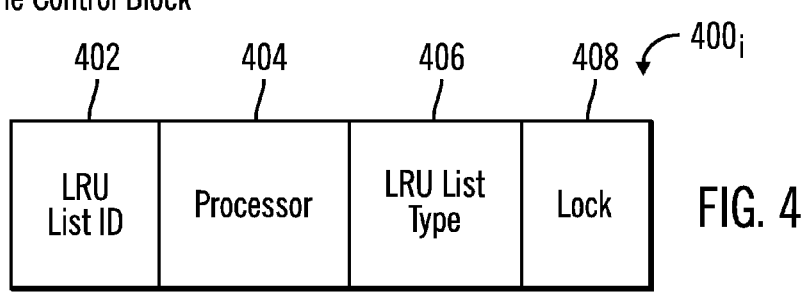
FIG. 4 illustrates an embodiment of LRU list information.

FIG. 4 illustrates an embodiment of LRU list information $400_i$, maintained for each of the LRU lists $300_i$ to provide metadata on the LRU list $200_i$, including, but not limited to, a LRU list identifier (ID) 402; a processor 404 comprising one of the processors 112 that is dedicated to processing the identified LRU list 402; an LRU list type 406 indicating a type of track managed on the LRU list 402, such as unmodified sequentially accessed track, unmodified non-sequentially accessed track, etc.; and a lock 408 that is accessed by a transaction in order to have exclusive access to the LRU list 402 for the purpose of adding track identifiers to the MRU end 202 or demoting tracks identified at the LRU end 204.

As mentioned, a track is associated with the cache control block $300_i$ providing information through the track index 124. Further, the cache control block index 302 can identify the location of the track in the cache 116, as the cache control block indexes are numbered sequentially and may provide offsets in the cache 116 at which the track is located.

In one embodiment, there may be only one set of LRU lists 200 for all the different types of data. In an alternative embodiment, there may be different sets of LRU lists for different types of data. In this way, tracks of a specific data type are managed in the LRU lists for that data type. For each data type, there are a plurality of LRU lists, one for each of the processors 112, and a cumulative counter indicating all the tracks identified in the LRU lists for the data type, i.e., all the tracks of the data type in the cache 116.

Figure 5:
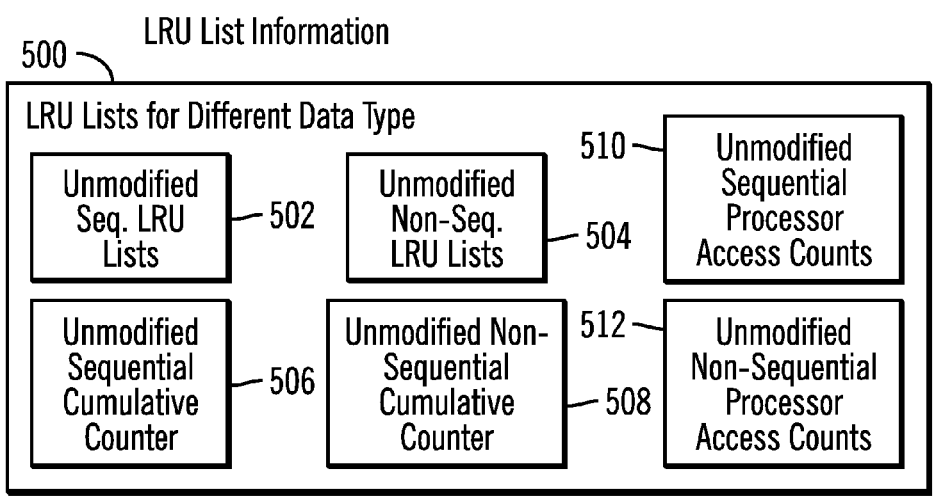
FIG. 5 illustrates an embodiment of LRU lists for different data types.

FIG. 5 illustrates an embodiment of LRU lists for different data types 500, such as unmodified sequentially accessed data and unmodified non-sequentially accessed data. In such embodiments, each of the processors 112 has one of the LRU lists for each of the different data types. For instance, there are unmodified sequential LRU lists 502, one for each of the processors 112, for unmodified sequentially accessed data staged into the cache 116, and unmodified non-sequential LRU lists 504, one for each of the processors 112, for unmodified non-sequentially accessed data staged into the cache 116. An unmodified sequential cumulative counter 506 indicates a number of unmodified sequential tracks in the cache 116 indicated on the unmodified sequential LRU lists 502 for all the processors 112. An unmodified non-sequential cumulative counter 508 indicates a number of unmodified non-sequential accessed tracks in the cache 116 indicated on the unmodified non-sequential LRU lists 504 for all the processors 112.

An unmodified sequential processor access counts 510 indicates a number of accesses, e.g., reads, by each of the processors 112 of tracks having unmodified sequential data that results in the tracks being maintained in the cache 112. An unmodified non-sequential processor access counts 512 indicates a number of accesses, e.g., reads, by each of the processors 112 of tracks having unmodified sequential data that results in the tracks being maintained in the cache 112

Figure 6:
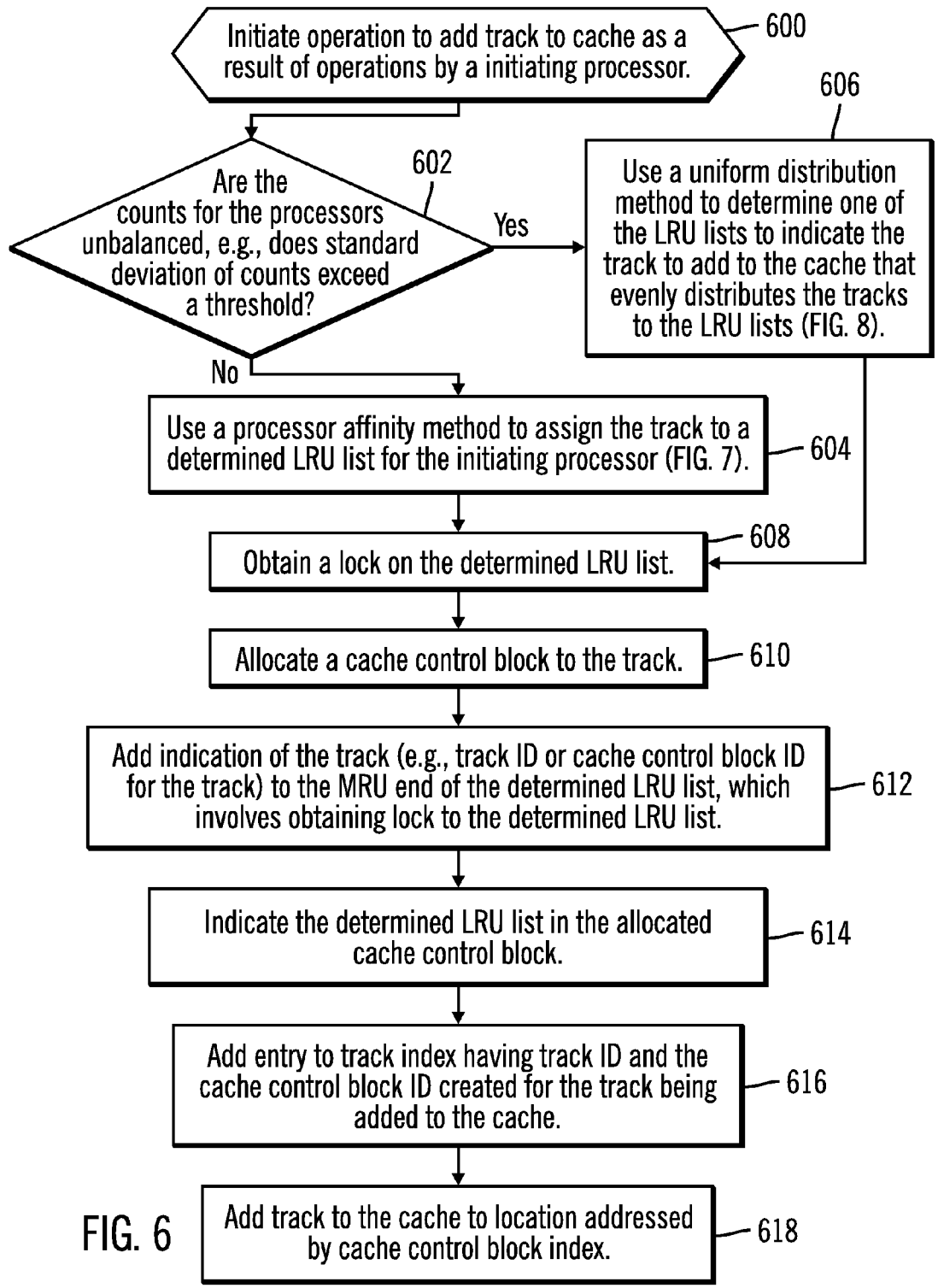
FIG. 6 illustrates an embodiment of operations to add a track to the cache.

FIG. 6 illustrates an embodiment of operations performed by the cache manager 120 to add a track to the cache 116 for an initiating processor 112 processing a read or prefetch operation that results in the track being added to the cache 116. The initiating processor 112 may be processing a track being staged into the cache 116 from the storage 110 for read access to one of the hosts 102a, 102b . . . 102n. Upon initiating (at block 600) the operation to add a track to the cache 116, the cache manager 120 determines (at block 602) whether the counts 130 for the processors 112 are unbalanced. In one embodiment, the counts 130 for the processors 112 may be unbalanced if the standard deviation of the counts exceeds a threshold. The standard deviation may be calculated according to equation (1) below, where $C_i$ is the count number of access requests initiated by processor i that resulted in a track being maintained in cache, $C_m$ is a mean of the counts for all the processors, and N is the number of processors 112:

(1)

$$\sqrt{\frac{\sum_{i=1}^{N}(C_i - C_m)^2}{N}}$$

The standard deviation threshold used to determine the point at which the access counts 130 among the processors 112 is unbalanced may be determined based on empirical analysis. Unbalanced access counts indicate that the workload balance of access requests allocated to the processors is uneven and unduly unbalanced such that the access requests allocated to LRU lists 200 needs to be adjusted or balanced by using different methods for determining the LRU list on which an added track is indicated.

Figure 7:
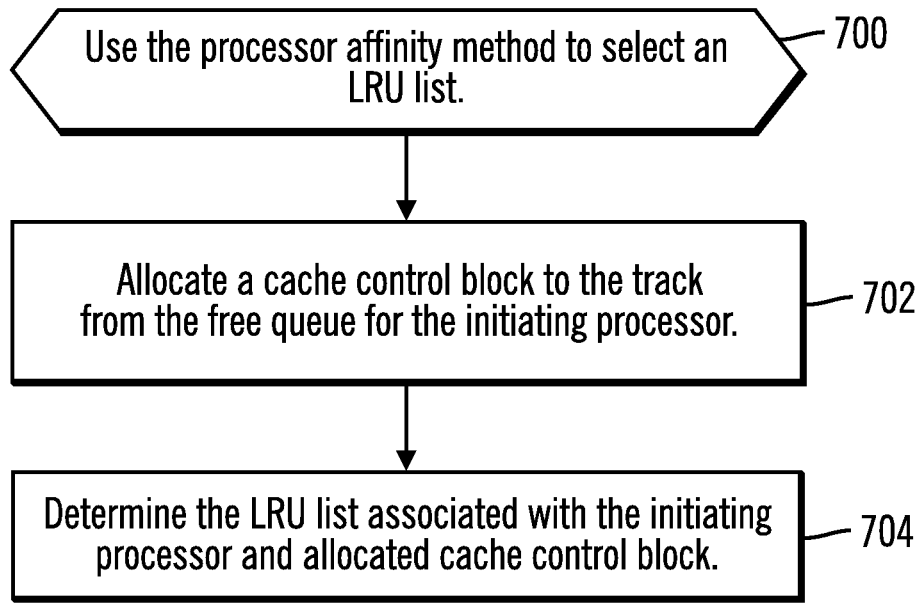
FIGS. 7 and 8 illustrate embodiments of methods used to determine an LRU list to which the track to add to cache is indicated.

If (at block 602) the access counts 130 are not unbalanced, i.e., balanced, then the cache manager 120 uses (at block 604) a processor affinity method, as described in FIG. 7, to assign the track to an LRU list $200_i$ for the initiating processor $112_i$. If (at block 602) the access counts 130 are unbalanced, then the cache manager 120 uses (at block 606) a uniform distribution method, such as described in FIG. 8, to determine one of the LRU lists 200 such that tracks are evenly distributed among the LRU lists 200 irrespective of the processor 112 that initiated the access request. In this way, if the access counts are not unbalanced, meaning read requests are relatively evenly distributed among the processors 112 within a standard deviation threshold, then the track is assigned to the LRU list $200_i$ of the processor $112_i$ initiating the request. However, if (from the yes branch of block 602) the access counts 130 are unbalanced, to reduce the extent of the imbalance, a different caching method is used to select the LRU list that does not just assign the access request to the LRU list $200_i$ of the initiating processor $112_i$, but instead selects an LRU list 200 in a manner that seeks to balance the assignment of tracks to the LRU lists 200, such as described with respect to FIG. 8.

After determining the LRU list $200_i$ to use, the lock 408 for the determined LRU list $200_i$ is obtained (at block 608). The cache manager 120 may obtain the lock 408 on the determined LRU list $200_i$ in order to add the track ID to the MRU end 202 of the determined LRU list $200_i$.

The cache manager 120 allocates (at block 610) a cache control block 300 to the track. The different access methods may also be used to select the cache control block $300_i$ to allocate to the track being added to the cache 116. For instance, in one embodiment where there are free queues 128 for different processors 112, then the cache control block 300 is allocated from the free queue $128_i$ assigned to the same processor $112_i$ to which the selected LRU list $200_i$ is assigned. For the processor affinity caching method, the free queue $128i$ and the LRU list $200_i$ are for the same processor $112_i$ that initiated the access request resulting in the caching of the track. However, for the uniform distribution method, the cache control block may be allocated from a free queue $128_i$ not assigned to the processor $112_j$ initiating the access request, when the determined LRU list $200_i$ is not assigned to the processor $112_j$ initiating the access request. The allocated cache control block has an index 302 identifying a location or offset of the track in the cache 116, the data type 306, e.g., unmodified sequential accessed data, unmodified non-sequentially accessed data, etc., and a cache timestamp 308 indicating a time the track was added to the cache 116. Further, the demote status 310 indicates not to demote because the track would be added to the MRU end 202 of the LRU list 200.

The cache manager 120 adds (at block 612) indication of the track (e.g., such as a track ID or cache control block ID, e.g., index, for the track) to the MRU end 202 of the determined LRU list $200_i$. The determined LRU list $200_i$ is indicated (at block 614) in field 304 of the cache control block $300_i$. An entry is added (at block 616) to the track index 124 associating the track ID with the cache control block $300_i$ created for the track being added to the cache 116. The track is then added (at block 618) to the cache 116 to a location addressed by the cache control block index.

With the described operation of FIG. 6, the evenness of the distribution of the counts 130 of track accesses by the processors 112 determines the LRU list 200 that is selected to avoid the situation that unbalanced distribution of processor track accesses results in imbalances in the distribution of tracks to the LRU lists 200. If the processor 112 access counts 130 are not unduly imbalanced, then the processor affinity method is used to assign the track to the LRU list $200_i$ of the processor $112_j$ that initiated the access request. On the other hand, if the processor access counts 130 are imbalanced, tracks are evenly distributed to the LRU lists 200 to balance the distribution of tracks among the LRU lists 200.

FIG. 7 illustrates an embodiment of operations performed by the cache manager 120 to select an LRU list 200 based on processor affinity. Upon initiating (at block 700) the processor affinity method to select a cache control block and LRU list 200, the cache manager 120 allocates (at block 702) a cache control block $300_i$ to the track from the free queue $128_i$ for the initiating processor $112_i$ initiating the access request. The cache manager 120 determines (at block 704) the LRU list $200_i$ associated with the initiating processor and the allocated cache control block $300_i$.

Figure 8:
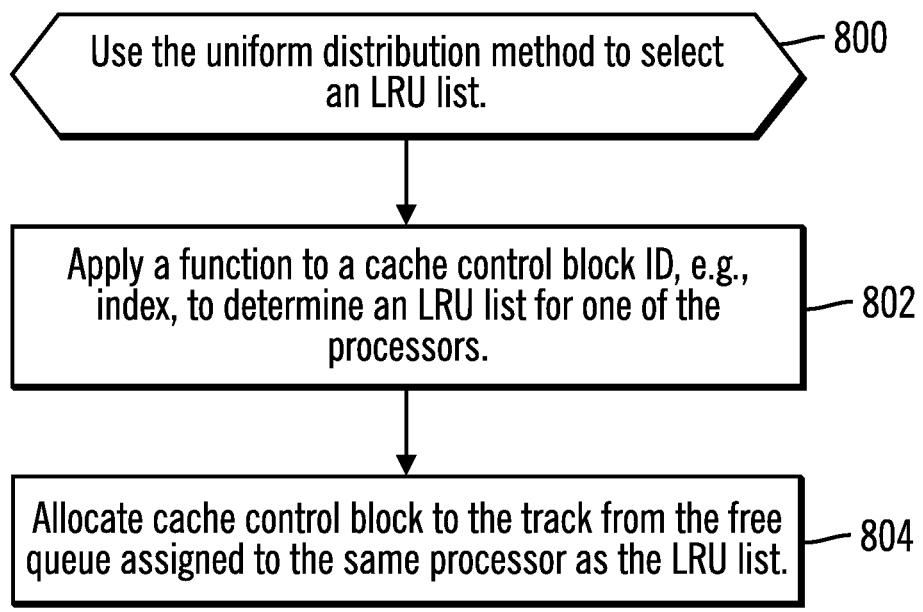

FIG. 8 illustrates an embodiment of operations performed by the cache manager 120 to select an LRU list by evenly distributing tracks among the LRU lists 200. Upon initiating (at block 800) the uniform selection method, the cache manager applies (at block 802) a function to the cache control block ID $300_i$ to determine an LRU list $200_i$ for one of the processors 112. For instance, the function may comprise a hash function applied to the cache control block index to produce an LRU list number to equally distribute the cache control block index values to the LRU lists 200. For instance, the function may comprise x modulo n, where x is the cache block index number, and n is the number of LRU lists 200, such that the result of the function determines the LRU list in which to indicate the cache control block. The function may distribute the tracks among the LRU lists 200 to provide an equal number of tracks on the LRU lists 200. In certain embodiments, the function distributes tracks to LRU lists independent of which processor 112 was access or writing to the track. For instance, a track written by one processor may be added to an LRU lists 200 associated with a processor other than the initiating processor that accessed the track to cause the placement in cache 116.

The cache manager 120 further allocates (at block 804) a cache control block to the track from the free queue $128_j$ assigned to the same processor $112_j$ associated with the determined LRU list $120_j$, which may be different or the same as the initiating processor $112_i$. In alternative embodiments, other techniques may be used to determine a free cache control block $300_j$ to allocate to the track to add to cache.

In embodiments where there are different types of lists, such as in FIG. 5, the cache manager 120 would first determine the data type of the track to add to the cache 116 and then perform the operations at blocks 602 through 618 for the LRU lists 502, 504 for that determined data type and indicate the determined data type in the cache control block $300_i$. Further, the counts 510, 512 that are considered at block 602 to determine unbalanced comprise the counts 510, 512 for the determined data type, e.g., unmodified sequential tracks or unmodified non-sequential tracks.

Figure 9:
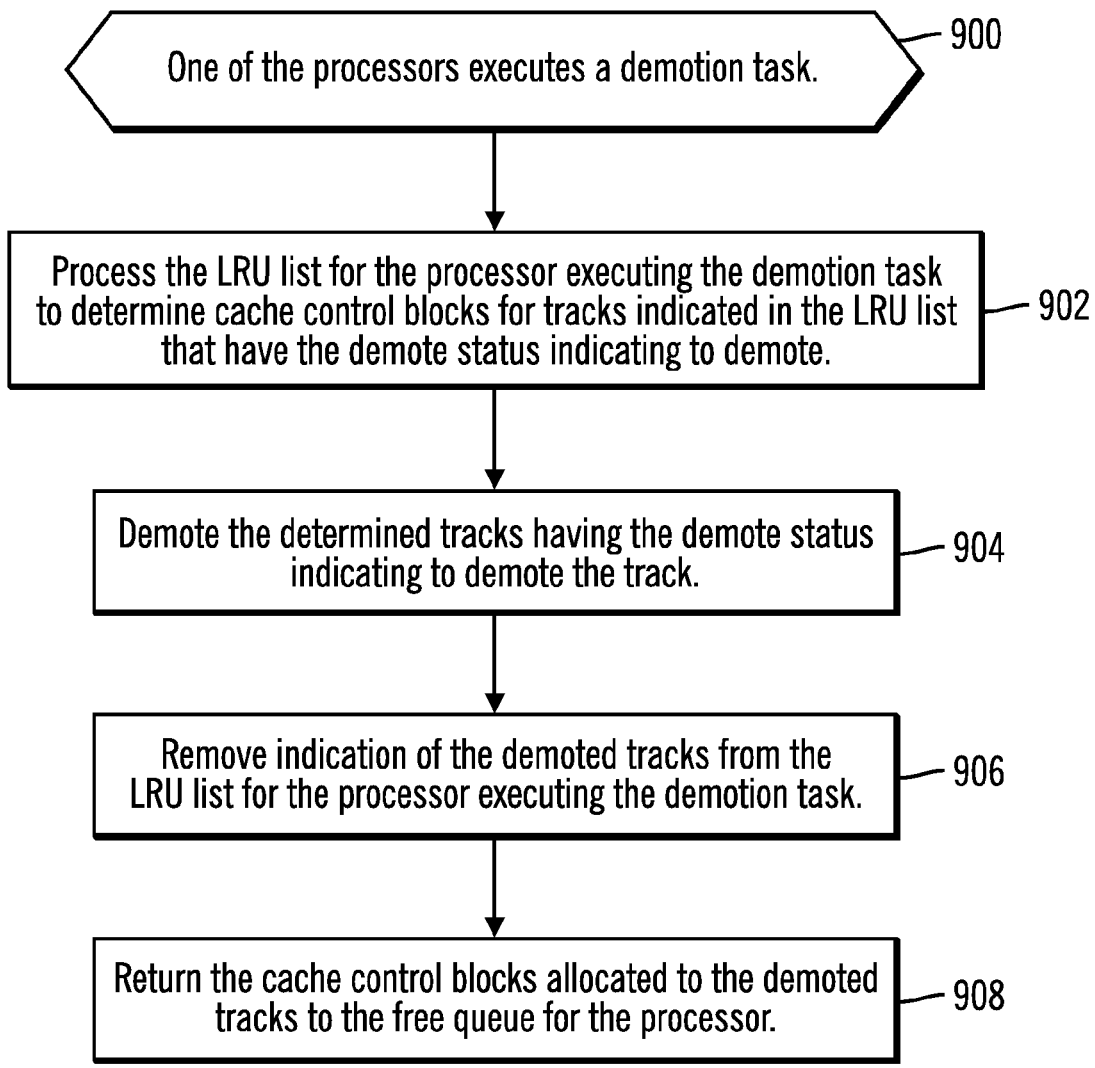
FIGS. 9 and 10 illustrate embodiments of operations to demote tracks from the cache.

FIG. 9 illustrates an embodiment of operations performed by one of the processors 112 to execute a demotion task 132 to demote tracks on the LRU list $200_i$ for processor $112_i$. Each of the processors $112_i$ may periodically execute a demotion task $132_i$ to demote tracks in the LRU list $200_i$ for the processor $112_i$. The processors 112 may periodically execute demotion tasks 132 to demote any tracks whose cache control block $300_i$ has a status indicating to demote. Alternatively, the cache manager 120 may invoke one or more of the processors 112 to execute their demotion task 132 to demote tracks. Upon one of the processors $112_i$ executing (at block 900) a demotion task $132_i$, the demotion task $132_i$ processes (at block 902) the LRU list $200_i$ for the processor $112_i$ executing the demotion task $132_i$ to determine cache control blocks for tracks indicated in the LRU list $200_i$ that have the demote status 310 indicating to demote. The demotion task $132_i$ demotes (at block 904) the determined tracks having the demote status 310 indicating to demote the track. Indication of the demoted tracks is removed (at block 906) from the LRU list $200_i$ for the processor $112_i$ executing the demotion task $132_i$. The cache control blocks $300_i$ for the demoted tracks are returned (at block 908) to the free queue 128 for the processor $112_i$ executing the demotion task $132_i$.

Figure 10:
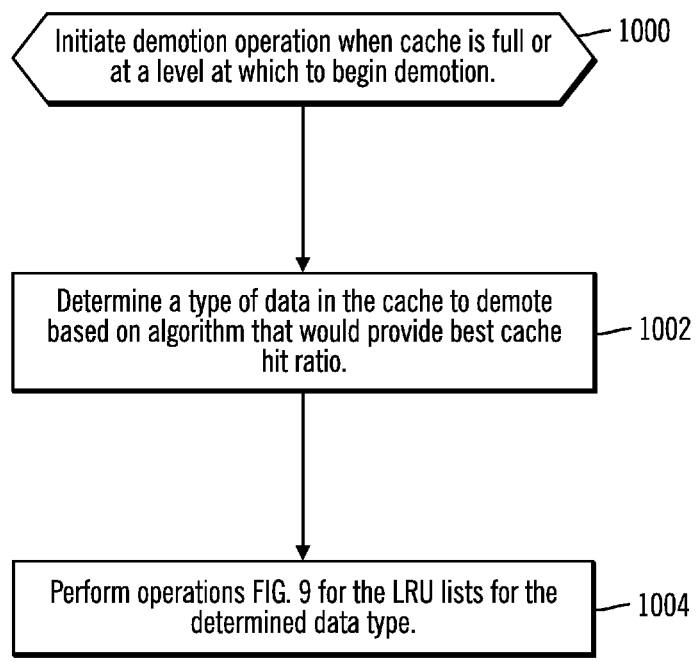

FIG. 10 illustrates an embodiment of operations performed by the cache manager 120 to determine a track to demote from cache 116 when there are multiple sets of LRU lists for different data types, such as the sets of LRU lists 502, 504. Upon initiating (at block 1000) the operation to select a track to demote from the cache 116, the cache manager 120 determines (at block 1002) a type of data in the cache 116 to demote. In one embodiment, the cache manager 120 may execute an algorithm to select a data type such that the selection will have the minimal impact on the cache hit ratio, i.e., maximize the cache hit ratio. In one embodiment, this may be selecting the data type whose cumulative counter 506 and 508 is the greatest. In alternative embodiments, other techniques may be used such as by selecting a data type whose data has been less frequently accessed in the cache 116. The cache manager 120 may then perform (at block 1004) the operations of FIG. 9 for the LRU lists 502, 504 for the determined data type, e.g., unmodified sequential data and unmodified non-sequential data.

In the described embodiment, the variables "i" and "j" when used with different elements may denote a same or different instance of that element.

Described embodiments provide techniques for partitioning cache control blocks and LRU lists by processor, such that groups of cache control blocks are assigned to each processor, there is one LRU list per processor, and one free queue for each processor to queue unassigned cache control blocks for that processor. In this way, contention is reduced by assigning each processor an LRU list and free queue to process, and a group of cache control blocks.

Further, with described embodiments, a track access count for each of the processors is considered to determine whether the track accesses among the processors are unbalanced, e.g., the standard deviation of the access counts among the processors exceeds a threshold. If the track accesses are unbalanced, then to ensure the LRU lists do not become more unbalanced, the cache manager 120 evenly distributes tracks to LRU lists, such that the track may be assigned to an LRU list that is not associated with the processor that initiated the track access request. Further, if the track accesses by processors are not unbalanced, then the track may be added to an LRU list assigned to the processor initiating the access request. Described embodiments thus take into account the distribution of access requests among processors to determine an LRU selection method to use to select the LRU list to which the track will be added.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
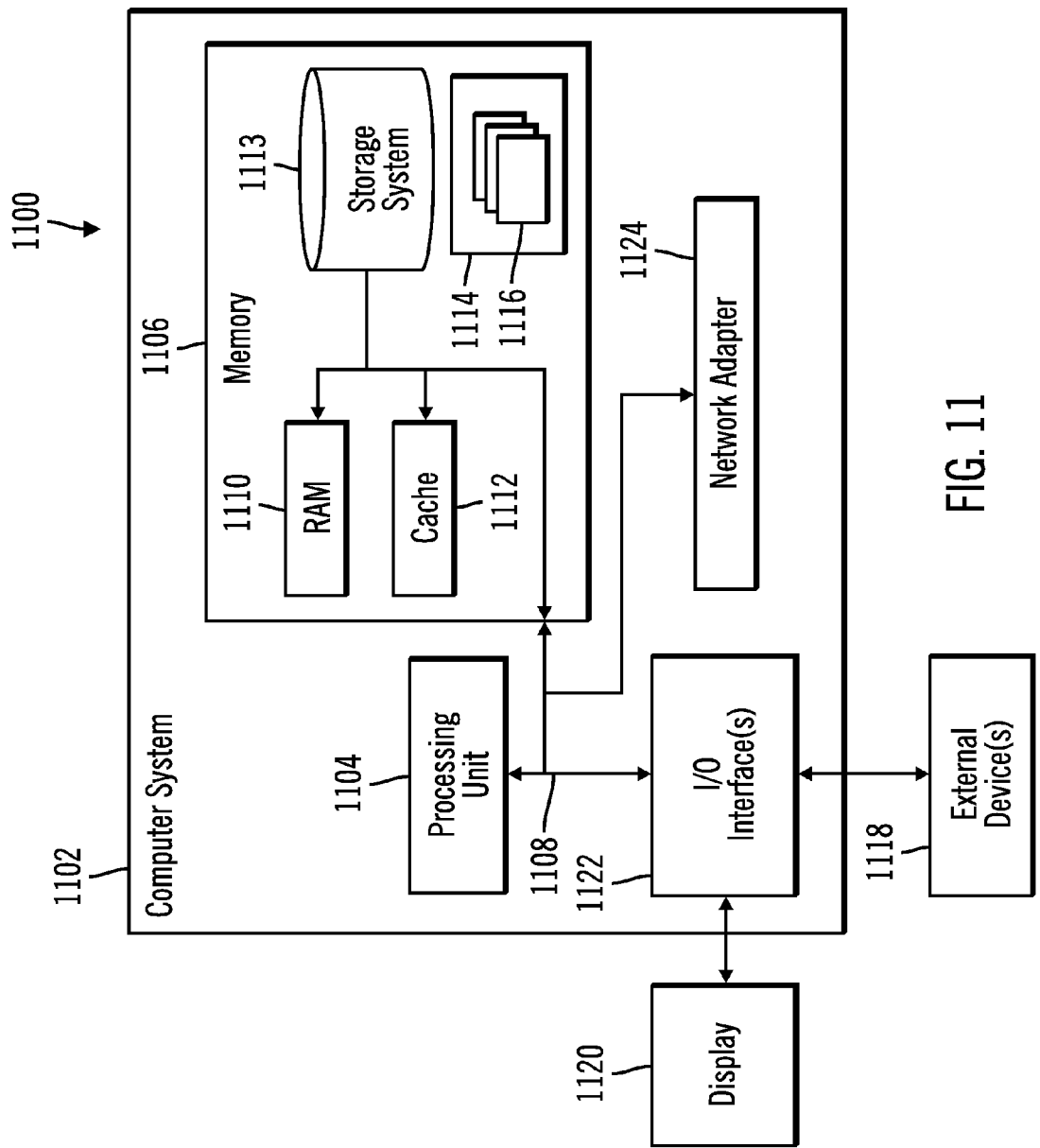
FIG. 11 illustrates a computing environment in which the components of FIG. 1 may be implemented.

The computational components of FIG. 1, including the hosts 102a, 102b . . . 102n and storage controller 104, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks, in a storage, in a cache accessed by a plurality of processors, the computer program product comprising a computer readable storage medium having computer readable program code embodied therein that when executed performs operations, the operations comprising:
    providing a plurality of lists, wherein there is one list for each of the plurality of processors;
    maintaining a count of a number of access requests for each of the processors resulting in one of the tracks being maintained in the cache;
    receiving a track to add to the cache for a request from an initiating processor comprising one of the processors;
    determining whether counts for the processors are unbalanced;
    using a first caching method to select one of the lists to indicate the track to add to the cache in response to determining that the counts are unbalanced; and
    using a second caching method to select one of the lists to indicate the track to add to the cache in response to determining that the counts are balanced, wherein the first and second caching methods provide different techniques for selecting one of the lists.

2. The computer program product of claim 1, wherein the first caching method evenly distributes tracks to add to the cache among the lists and wherein the second caching method distributes tracks to add to the cache to a list for the initiating processor.

3. The computer program product of claim 1, wherein the determining whether the counts for the processors are unbalanced comprises determining whether a standard deviation of the counts exceeds a threshold, wherein the counts are unbalanced when the standard deviation exceeds the threshold.

4. The computer program product of claim 1, wherein the operations further comprise:
    providing assignments of cache control blocks to the processors, wherein a track added to the cache for one of the processors is assigned one of the cache control blocks assigned to the processor when the second caching method is used;
    wherein the using the second caching method comprises:
        allocating one of the cache control blocks assigned to the initiating processor for the track to add to the cache; and
        indicating the track to add to the cache on a list for the initiating processor.

5. The computer program product of claim 4, wherein the operations further comprise:
    providing a free queue for each of the processors including the cache control blocks assigned to the processors that are not allocated to tracks in the cache and are available for assignment to tracks to add to the cache, wherein a cache control block is allocated from the free queue assigned to the initiating processor when the second caching method is used.

6. The computer program product of claim 4, wherein the using the first caching method comprises:
    applying a function to a control block identifier allocated to the track to add to the cache to determine one of the lists in which to include a track identifier of the track added to the cache, wherein the track is indicated in the determined list.

7. The computer program product of claim 6, wherein the using the first caching method further comprises:
    allocating one of the cache control blocks assigned to the initiating processor for the track to add to the cache, wherein in a plurality of applications of the function to the allocated cache control block the determined list does not comprise a list associated with the initiating processor.

8. The computer program product of claim 1, wherein there are a plurality of lists, one for each of the processors, for each of a plurality of different data types of the tracks in the storage, wherein the operations further comprise:
    determining one of the data types of the track to add to the cache, wherein the the list selected according to the first and second caching method is determined from the lists for the determined data type.

9. The computer program product of claim 8, wherein a count is maintained for each of the data types for each of the processors for access requests of tracks of the data types, wherein the determining whether the counts for the processors are unbalanced comprising determining whether the counts for the determined data type for the processors are unbalanced.

10. The computer program product of claim 1, wherein the lists comprise Least Recently Used (LRU) lists and wherein indication of the track to add to the cache is added to a most recently used end of the selected list, wherein the tracks are demoted from a least recently used end of the LRU list.

11. The computer program product of claim 1, wherein the counts are maintained for an interval period of time and reset to zero after each of the interval periods of time to periodically reset.

12. A system for managing tracks in a storage, comprising:
    a plurality of processors;
    a cache; and a cache manager that when executed performs operations, the operations comprising:
  providing a plurality of lists, wherein there is one list for each of the plurality of processors;
  maintaining a count of a number of access requests for each of the processors resulting in one of the tracks being maintained in the cache;
  receiving a track to add to the cache for a request from an initiating processor comprising one of the processors;
  determining whether counts for the processors are unbalanced;
  using a first caching method to select one of the lists to indicate the track to add to the cache in response to determining that the counts are unbalanced; and
  using a second caching method to select one of the lists to indicate the track to add to the cache in response to determining that the counts are balanced, wherein the first and second caching methods provide different techniques for selecting one of the lists.

13. The system of claim 12, wherein the first caching method evenly distributes tracks to add to the cache among the lists and wherein the second caching method distributes tracks to add to the cache to a list for the initiating processor.

14. The system of claim 12, wherein the operations further comprise:
  providing assignments of cache control blocks to the processors, wherein a track added to the cache for one of the processors is assigned one of the cache control blocks assigned to the processor when the second caching method is used;
  wherein the using the second caching method comprises:
    allocating one of the cache control blocks assigned to the initiating processor for the track to add to the cache; and
    indicating the track to add to the cache on a list for the initiating processor.

15. The system of claim 14, wherein the operations further comprise:
  providing a free queue for each of the processors including the cache control blocks assigned to the processors that are not allocated to tracks in the cache and are available for assignment to tracks to add to the cache, wherein a cache control block is allocated from the free queue assigned to the initiating processor when the second caching method is used.

16. The system of claim 14, wherein the using the first caching method comprises:
  applying a function to a control block identifier allocated to the track to add to the cache to determine one of the lists in which to include a track identifier of the track added to the cache, wherein the track is indicated in the determined list.

17. The system of claim 16, wherein the using the first caching method further comprises:
  allocating one of the cache control blocks assigned to the initiating processor for the track to add to the cache, wherein in a plurality of applications of the function to the allocated cache control block the determined list does not comprise a list associated with the initiating processor.

18. A method for managing tracks in a storage in a cache accessed by a plurality of processors, comprising:
  providing a plurality of lists, wherein there is one list for each of the plurality of processors;
  maintaining a count of a number of access requests for each of the processors resulting in one of the tracks being maintained in the cache;
  receiving a track to add to the cache for a request from an initiating processor comprising one of the processors;
  determining whether counts for the processors are unbalanced;
  using a first caching method to select one of the lists to indicate the track to add to the cache in response to determining that the counts are unbalanced; and
  using a second caching method to select one of the lists to indicate the track to add to the cache in response to determining that the counts are balanced, wherein the first and second caching methods provide different techniques for selecting one of the lists.

19. The method of claim 18, wherein the first caching method evenly distributes tracks to add to the cache among the lists and wherein the second caching method distributes tracks to add to the cache to a list for the initiating processor.

20. The method of claim 18, further comprising:
  providing assignments of cache control blocks to the processors, wherein a track added to the cache for one of the processors is assigned one of the cache control blocks assigned to the processor when the second caching method is used;
  wherein the using the second caching method comprises:
    allocating one of the cache control blocks assigned to the initiating processor for the track to add to the cache; and
    indicating the track to add to the cache on a list for the initiating processor.

21. The method of claim 20, further comprising:
  providing a free queue for each of the processors including the cache control blocks assigned to the processors that are not allocated to tracks in the cache and are available for assignment to tracks to add to the cache, wherein a cache control block is allocated from the free queue assigned to the initiating processor when the second caching method is used.

22. The method of claim 20, wherein the using the first caching method comprises:
  applying a function to a control block identifier allocated to the track to add to the cache to determine one of the lists in which to include a track identifier of the track added to the cache, wherein the track is indicated in the determined list.

23. The method of claim 22, wherein the using the first caching method further comprises:
  allocating one of the cache control blocks assigned to the initiating processor for the track to add to the cache, wherein in a plurality of applications of the function to the allocated cache control block the determined list does not comprise a list associated with the initiating processor.

* * * * *